E. DE JOURNO.
VEHICLE WHEEL.
APPLICATION FILED JAN. 17, 1911.

1,068,224.

Patented July 22, 1913.
2 SHEETS—SHEET 1.

WITNESSES:

INVENTOR
Ernest De Journo
BY
his ATTORNEYS

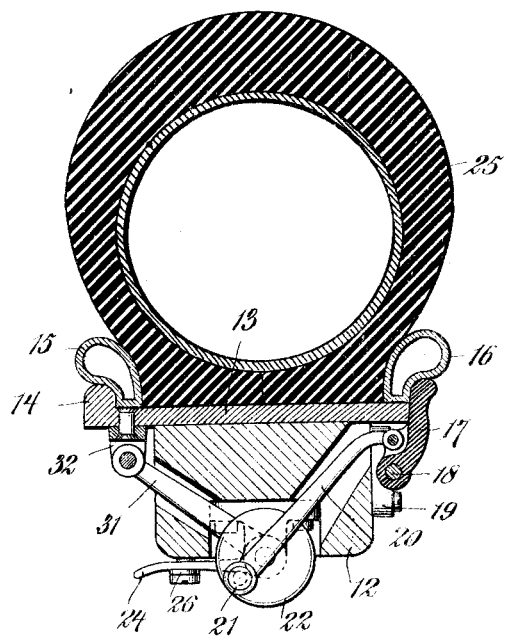

UNITED STATES PATENT OFFICE.

ERNEST DE JOURNO, OF ALLENTOWN, PENNSYLVANIA, ASSIGNOR TO STELLA LABÉ, OF NEW YORK, N. Y.

VEHICLE-WHEEL.

1,068,224.　　　　Specification of Letters Patent.　　Patented July 22, 1913.

Application filed January 17, 1911. Serial No. 603,052.

*To all whom it may concern:*

Be it known that I, ERNEST DE JOURNO, a citizen of the United States of America, and a resident of Allentown, county of Lehigh, and State of Pennsylvania, have invented certain new and useful Improvements in Vehicle-Wheels, of which the following is a specification, reference being had to the accompanying drawings, forming a part thereof.

My invention relates to vehicle wheels, and particularly to vehicle wheels employing pneumatic or other tires, and my invention relates specifically to a new and improved means for facilitating the removal of such pneumatic tires.

In carrying out my invention I employ a laterally removable flange in connection with the rim of the wheel, and fingers for normal coengagement with the said removable flange to hold it in position when the tire is in place, together with means by which such fingers may be thrown out of engagement with the flange to permit the lateral removal thereof when it is desired to remove the tire.

My invention also consists in the employment in combination with such means, of means by which the tire is shifted laterally to start the removal thereof upon the operation of the said fingers as aforesaid.

My invention also consists in many novel details of construction and combinations of parts, including means whereby the fingers are locked in their normal positions in engagement with the removable flange to hold it in place, all as will be fully pointed out hereinafter.

In order that my invention may be fully understood I will now proceed to describe an embodiment thereof, having reference to the accompanying drawings illustrating the same, and will then point out the novel features in claims.

Figure 1:
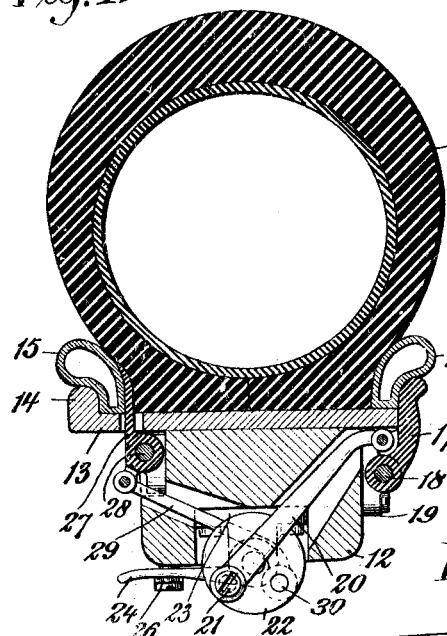
Figure 2:
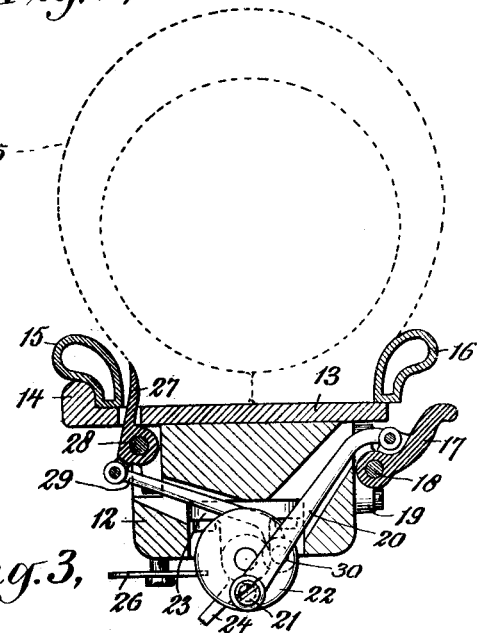
Figure 3:
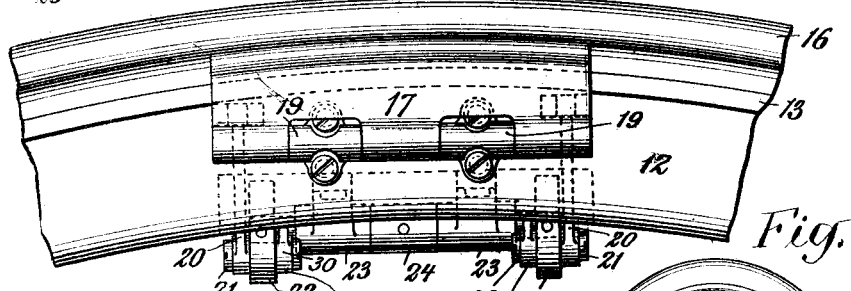
Figure 4:
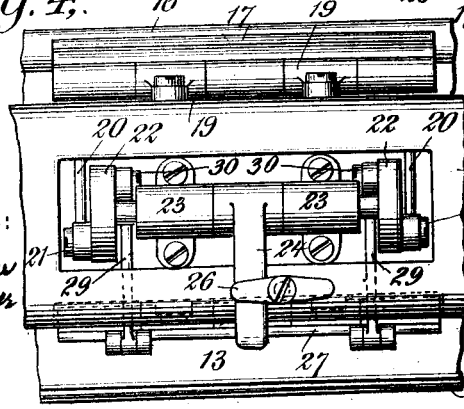
Figure 5:
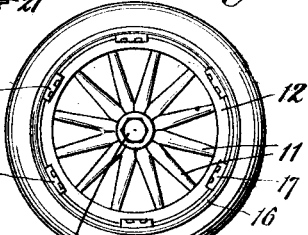

In the drawings: Figure 1 is a view in transverse section through the rim and tire of a wheel constructed in accordance with my invention, the plane of section being taken through one of the tire operating and retaining devices. Fig. 2 is a similar view showing the tire operating and retaining devices in other positions. Fig. 3 is a view in side elevation of a part of the rim portion of the wheel showing one of the tire operating and retaining devices. Fig. 4 is a detail view looking outward from the interior of the wheel toward one of the tire operating and retaining devices. Fig. 5 is a view on a reduced scale of the entire wheel, showing a plurality of the tire and operating devices distributed around it. Fig. 6 is a detail transverse sectional view similar to Fig. 1, showing a modified form in which the locking device and its operating means is employed but the tire operating means is dispensed with.

The wheel as a whole comprises the usual hub 10, spokes 11, and felly 12. The felly may be of wood as is usual, though of course it may be of other material if preferred. Surrounding the felly is a rim 13 having an abutment 14 at one edge thereof. A flange 15 is supported by the rim in proximity to the abutment 14, being held against outward lateral movement by the said abutment. This flange may be conveniently slipped into place and be held from lateral displacement only by the abutment, but except under extraordinary conditions this flange is not intended to be removable. It may of course be removed if desired for purposes of renewal or repair, but it is not necessary to remove it when removing the tire. Another flange 16 mounted upon the opposite edge of the rim 13 is, however, arranged to be laterally removed whenever it is desired to remove the tire. This flange is arranged to be laterally engaged by a plurality of fingers 17. A suitable number of these fingers are distributed around the wheel as appears in Fig. 5, any desired number being employed as may be found necessary. These fingers are individually mounted about pivots 18 suitably carried by brackets 19 secured to the felly of the wheel or elsewhere, the pivots being so arranged that the fingers in moving about the axes thereof swing laterally with respect to the flange 16 to a position in engagement therewith as shown in Fig. 1, and to a position wherein they will be clear of the lateral path of movement of the said flange when it is being removed as appears in Fig. 2. These fingers are connected by connecting rods or links 20 with pins 21 eccentrically mounted upon disks 22. The disks 22 are rotatably mounted in suitable bearings 23 secured to the underside of the felly of the wheel, the felly being preferably recessed as is shown in the drawings, to receive the bearing brackets and portions of the disks. Operating members in the form of short arms or levers 24 are provided for the disks by which they may be axially rotated. When the device is in its normal locked position as shown in Fig. 1 lines passing through the pivotal connections of the links with the operating fingers and their disks, preferably just cross the axial center of the disks, whereby a knuckle or toggle lock is effected. By depressing the levers 24 these lines pass to the opposite side of the axial center of rotation of the disks so as to break joint, and thereafter, in the continued downward movement of the operating arms 24 and the consequent movements of rotation of the disks, the fingers 17 will be thrown down to the position shown in Fig. 2. In this position the flange 16 may be laterally removed and the tire 25 may be thereupon withdrawn from its engagement with the rim 13.

While the foregoing construction and arrangement of parts will constitute a lock for the fingers in the position in which they are shown in Fig. 1, I preferably employ as a matter of safety, an additional locking means constituting means operating to engage the arms 24 when in their upper positions. A simple form of such means is shown in the drawings constituting a pivoted button or latch 26 which may be turned to the position shown particularly in Fig. 4 to hold the arms in their said adjusted positions.

In order to start the removal of the tire when the removable flange 16 is released, I have shown operating fingers 27 pivotally mounted as at 28, and connected by suitable links 29 with other eccentric pins 30 upon the disks 22. When the disks are rotated as aforesaid to release the fingers 17 from their engagement with the removable flange 16, these operating fingers 27 will be rocked about their supports and the upper extremities thereof in their engagement with the tire between the inner edge thereof and the adjacent edge of the relatively stationary flange 15, will operate to slightly shift the position of the tire as is shown in Fig. 2. This will also have the effect of starting the removable flange 16 from its position so that it may thereafter be readily removed by hand. In addition to the device just described constituting a means for starting the removal of the tire, it also constitutes an effective means for strengthening the parts, avoiding an undue lateral strain coming upon the wooden felly. By the employment thereof the strain of holding the removable flange 16 in place is transferred from the supports for the disks 22 to the links 29 which thus constitute diagonal stays, as will be readily understood, and indeed I consider some such means so desirable that where the tire operating device including the fingers 27 and the links 29 are not employed, I preferably provide special diagonal stays 31 such as are shown in Fig. 6, one end of which embraces the axles of the disks respectively, and the opposite end of which is secured to the rim 13 upon the opposite side thereof to that upon which the removable flange is mounted, as by means of little brackets 32 secured thereto as is shown.

What I claim is:

1. In a wheel the combination with a felly a rim and a laterally removable flange therefor, of a plurality of fingers pivotally mounted at their inner ends, means pivotally supported on the felly for moving the said fingers about their pivots into and out of engagement with the said flange, tire starting means at the opposite side of the rim and links operatively connecting the aforesaid means and constituting diagonal stays for the removable flange.

2. In a wheel the combination with a rim, and a laterally removable flange therefor, of a plurality of fingers pivotally mounted at their inner ends arranged to engage the said flange to hold it in place, and operating means for moving the fingers out of such engagement, comprising rotatable elements and links pivoted eccentrically to the said rotatable elements and to the said fingers.

3. In a wheel the combination with a rim, and a laterally removable flange therefor, of a plurality of fingers pivotally mounted at their inner ends, operating means for moving the said fingers about their pivots into and out of lateral engagement with the said flange, comprising rotatable elements and links pivoted eccentrically to the said rotatable elements and to the said fingers, and tire starting fingers connected to said rotatable elements.

4. In a wheel the combination with a rim, and a laterally removable flange therefor, of a plurality of fingers pivotally mounted at their inner ends arranged to engage the said flange to hold it in place, operating means for moving the fingers out of such engagement, comprising rotatable elements and links pivoted eccentrically to the said rotatable elements and to the said fingers, and locking means for the said rotatable elements.

5. In a wheel the combination with a rim, and a laterally removable flange therefor, of a plurality of fingers pivotally mounted at their enner ends, operating means for moving the said fingers about their pivots into and out of lateral engagement with the said flange, comprising rotatable elements and links pivoted eccentrically to the said rotatable elements and to the said fingers, tire starting fingers connected to said rotatable elements and locking means for the said rotatable elements.

6. In a wheel, the combination with a tire supporting rim, and a laterally removable flange therefor, of a plurality of fingers pivotally mounted at their inner ends arranged to engage the said flange upon one side of the wheel, a plurality of operating fingers arranged to engage the tire upon the opposite side of the said wheel, and operating means between the two sets of fingers in operative connection with both of them whereby the said two sets of fingers are simultaneously operated.

7. In a wheel, the combination with a tire supporting rim, and a removable flange therefor, of a plurality of fingers pivotally mounted at their inner ends arranged to engage the said flange upon one side of the rim, a plurality of operating fingers arranged to engage the tire upon the opposite side of the rim, rotatable elements between the two sets of fingers, and links connected respectively to the two sets of fingers and eccentrically to the said rotatable elements, whereby the said two sets of fingers are operated simultaneously.

ERNEST DE JOURNO.

Witnesses:
D. HOWARD HAYWOOD,
LYMAN S. ANDREWS, Jr.